United States Patent

Chen

[11] Patent Number: 5,937,929
[45] Date of Patent: Aug. 17, 1999

[54] CAR CURTAIN

[76] Inventor: Ing-Wen Chen, No, 23, Lane 207, Kao-Feng Road, Hsin-Chu, Taiwan

[21] Appl. No.: 08/965,408

[22] Filed: Nov. 6, 1997

[51] Int. Cl.[6] ............................................. B60J 1/20
[52] U.S. Cl. .................. 160/370.23; 160/84.06; 296/97.8; 296/138
[58] Field of Search ................... 296/97.7, 97.8, 296/138, 152; 160/84.04, 84.05, 84.06, 370.23, DIG. 2, DIG. 3

[56] References Cited

U.S. PATENT DOCUMENTS

| | | | |
|---|---|---|---|
| 4,647,102 | 3/1987 | Ebrahimazdeh | 160/84.04 |
| 4,733,710 | 3/1988 | Haines | 160/84.06 |
| 4,886,104 | 12/1989 | Eldridge, Jr. | 296/97.7 X |
| 5,042,550 | 8/1991 | Yee | 160/84.04 |
| 5,044,686 | 9/1991 | Acenbrack | 296/97.8 X |
| 5,067,541 | 11/1991 | Coslett | 160/84.04 |
| 5,269,360 | 12/1993 | Chen | 160/84.06 |
| 5,477,904 | 12/1995 | Yang | 160/370.23 |
| 5,778,955 | 7/1998 | Chen | 160/84.06 |
| 5,787,956 | 8/1998 | Chen | 296/97.8 X |

*Primary Examiner*—D. Glenn Dayoan
*Assistant Examiner*—Chad D. Wells
*Attorney, Agent, or Firm*—Pro-Techtor International Services

[57] ABSTRACT

The present invention relates to a car curtain for covering a car window, comprising: a main body, mounted on the window frame by several fixing devices, allowing the car curtain to be installed at any desired angle within the car window; a pleated curtain, having a rear edge, which is mounted on the main body, and a front edge, which is movable against the rear edge for unfolding or folding the pleated curtain; and a guiding system, which is mounted on the main body and from which a guider extends with a variable length, the guider running along the outer side of the pleated curtain or through holes in the pleated curtain near the upper edge thereof and consisting of at least one thread with a rear end, connected to the guiding system, and a front end, attachable to a fixing element at a fixed position on the car window; wherein the guider prevents the pleated curtain from swaying and keeps the pleated curtain close to the car window.

7 Claims, 9 Drawing Sheets

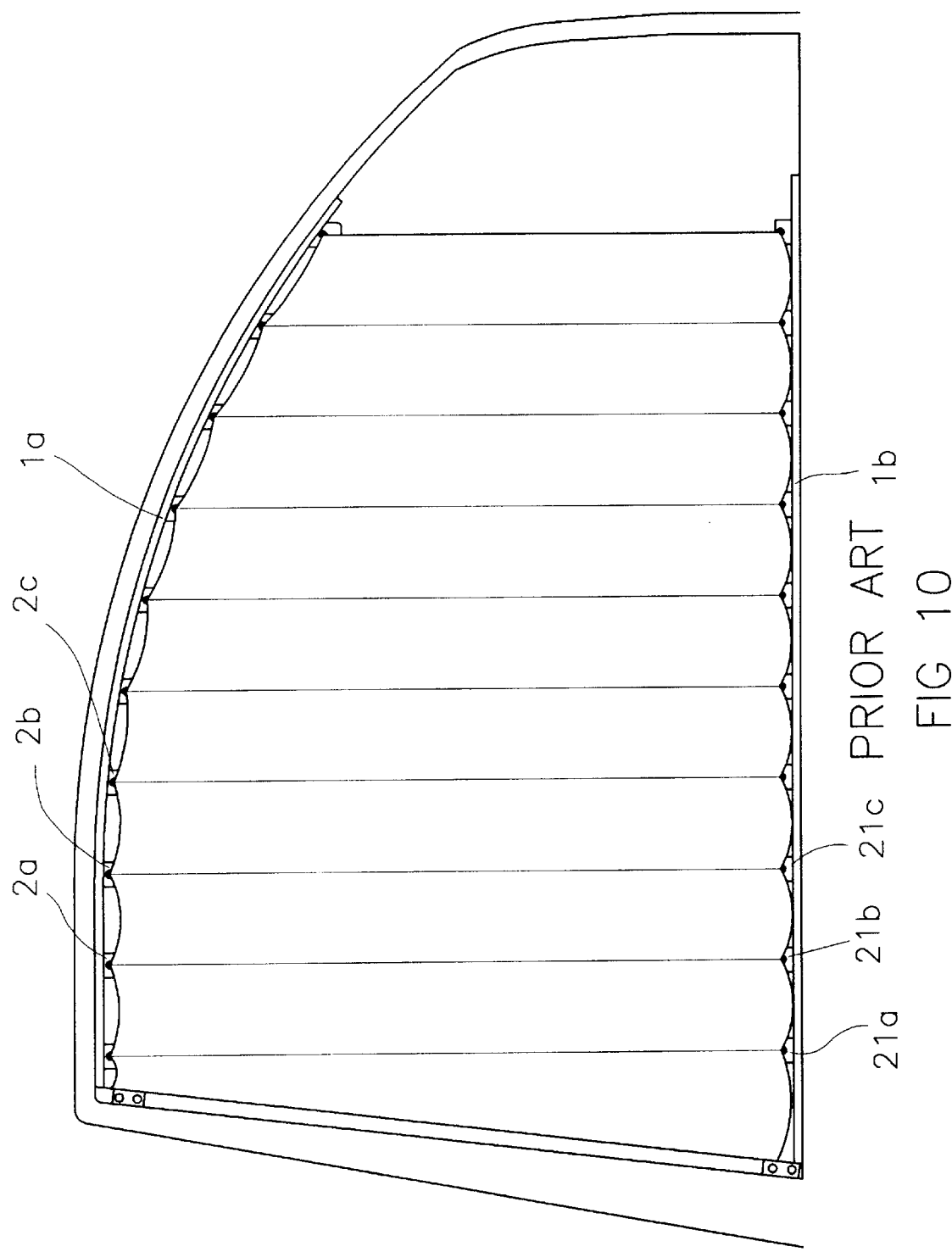

5,937,929

CAR CURTAIN

BACKGROUND OF THE INVENTION

1. Field of the Invention

The present invention relates to a car curtain, particularly to a car curtain which is cuttable to fit into a given window, is of simple structure and easy to use.

2. Description of Related Art

Conventional car curtains are curtains having two rails, heat insulating paper or electrostatic curtains. As shown in FIG. 10, a conventional car curtain with two rails 1a, 1b has curtain material of a shape that fits in a car window. Gliding pieces 2a, 2b, . . . 21a, 21b, 21c, . . . are attached to the curtain material for gliding on the two rails 1a, 1b. The arc-like or slanted shape of the car curtain, however, does not allow to fold it up, so the car window is always covered. Car curtains with two rails are fit in windows with converging upper and lower edges by using elastic material. On the end where the distance between the upper and lower edges is large, a large force is exerted on the gliding pieces, such that the gliding pieces eventually are at risk to break. When the curtain is moved aside, to the end where the distance between the upper and lower edges is small, wrinkles in the curtain give an ugly appearance. For assembling the curtain, many gliding pieces have to be attached, complicating the production of the curtain. The rails 1a, 1b are fixed on the car window by double-sided adhesive tape. Adhesive tape, however, does not withstand the elastic force of stretched curtain material or high temperatures, so will eventually become loose, and it is hard to remove. Furthermore, a conventional car curtain does not fit exactly the shape of a given car window, so bad-looking gaps between the curtain and the window edges remain.

Heat insulating paper may be cut to the shape of the car window and glued thereto, but is hard to remove and has little effect. Electrostatic curtains are cuttable to any desired large shape, but are expensive to produce, cannot be stored and lose their adhesiveness after some time. Heat insulating paper and electrostatic curtains are not connected to the present invention and are cited here as a reference only.

SUMMARY OF THE INVENTION

The main object of the present invention is to provide a car curtain of simple structure, which is easy to install.

Another object of the present invention is to provide a car curtain, which is cut by the user and thus allows to be installed on a car window of any size and shape.

A further object of the present invention is to provide a car curtain, which is foldable when not used.

The present invention can be more fully understood by reference to the following description and accompanying drawings.

BRIEF DESCRIPTION OF THE DRAWINGS

FIG. 10 is a side view of a conventional car curtain with two rails.

DETAILED DESCRIPTION OF THE PREFERRED EMBODIMENTS

As shown in each Fig., the car curtain of the present invention serves to cover a car window. The car curtain of the present invention mainly comprises: a main body 10; a pleated curtain 20, which is foldable onto the main body 10; and a guiding system 30, mounted on the main body 10.

Figure 1:
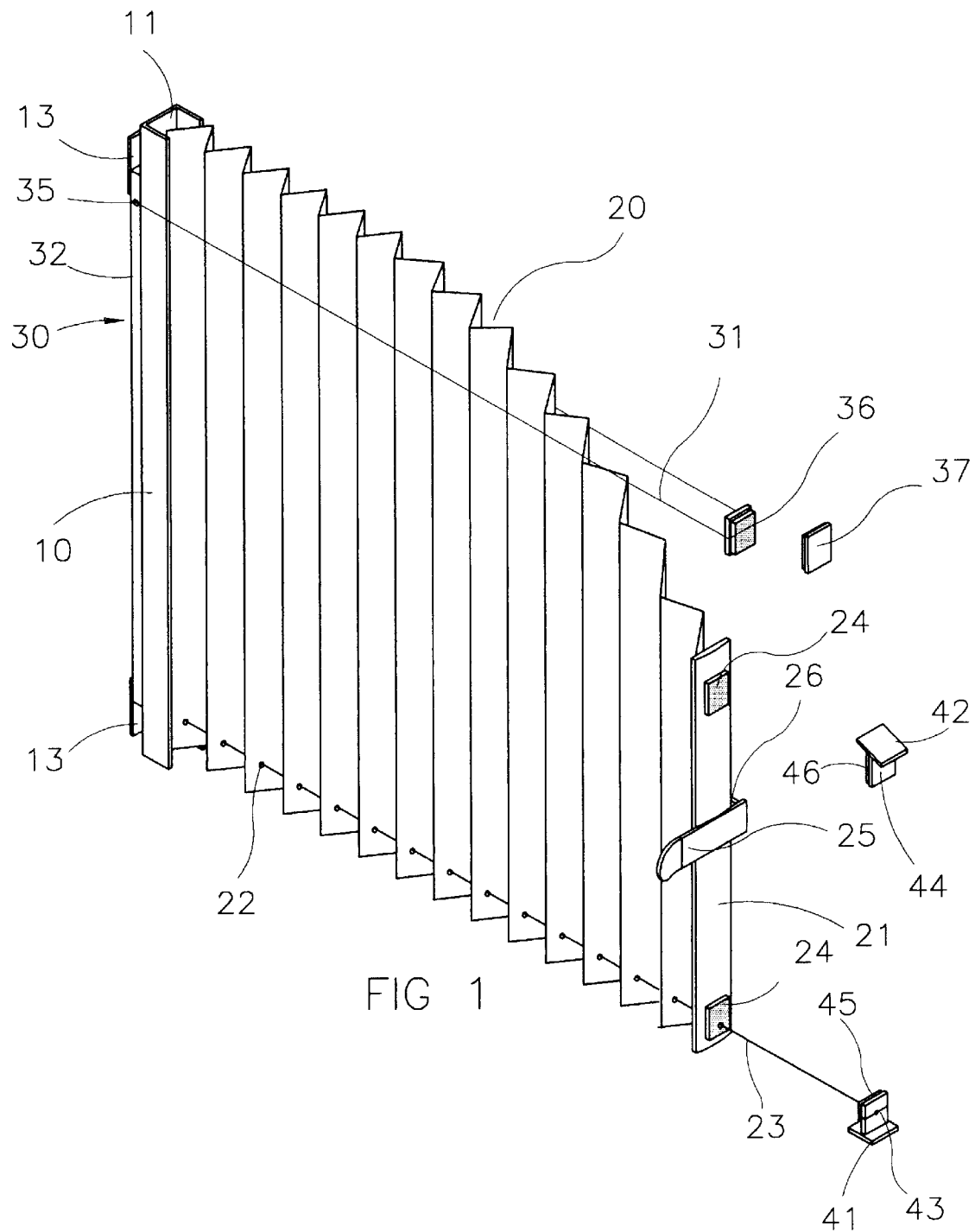
FIG. 1 is a perspective view of the car curtain of the present invention.
Figure 2:
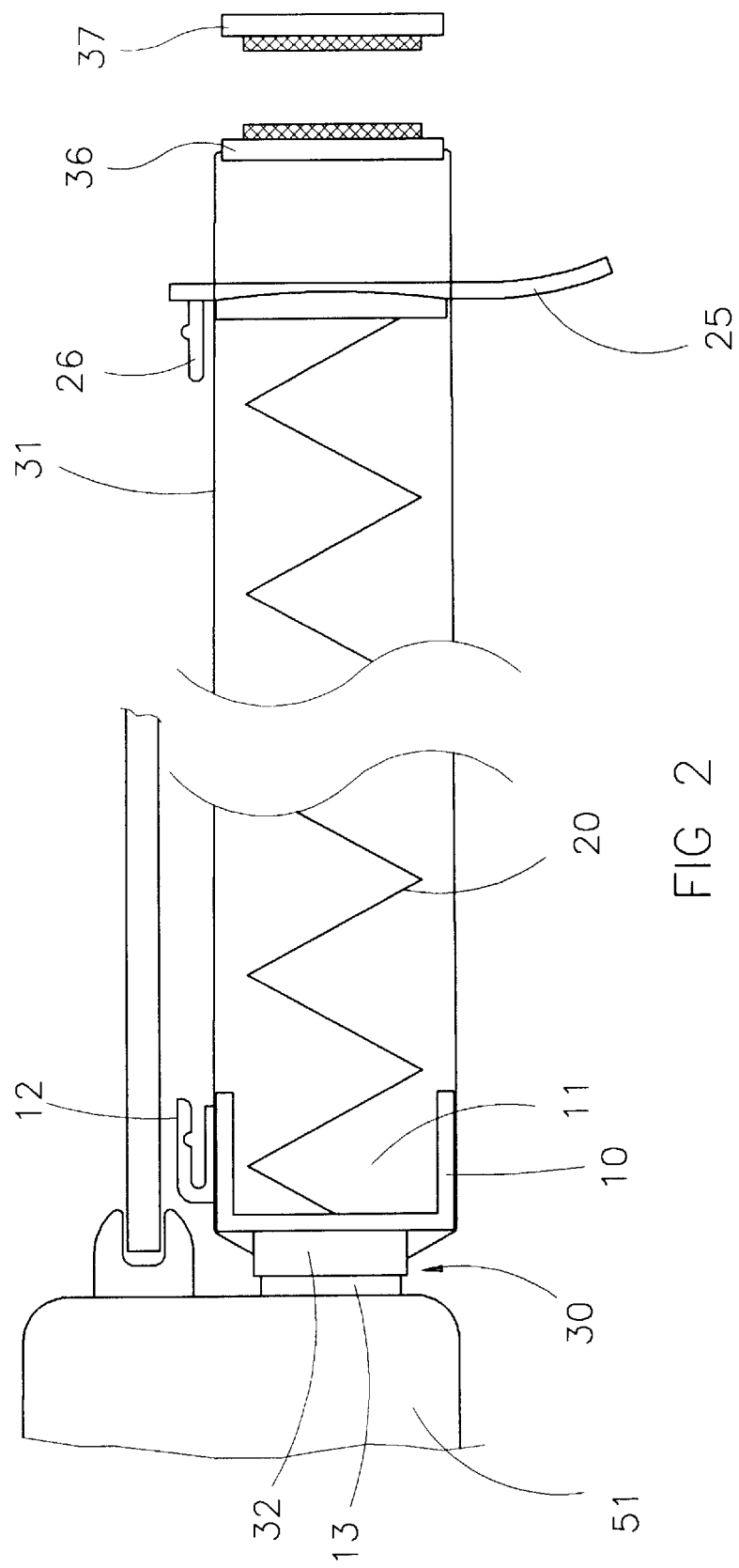
FIG. 2 is a top view of the car curtain of the present invention.

Referring to FIGS. 1 and 2, the main body 10 is an elongated body with a U-shaped cross-section, into which a groove 11 is cut for accommodating the pleated curtain 20, when folded. The main body 10 carries the guiding system 30 and several fixing devices 13 for fixing the main body 10 on the car window. The pleated curtain 20 is mainly made of sun-protecting textile with parallel front and rear edges and pleats parallel thereto. The rear edge of the pleated curtain 20 is attached to the inside of the groove 11 of the main body 10. The front edge of the pleated curtain 20 is free, having a fixing strip 21.

Each of the pleats of the pleated curtain 20 has a lower end with a through hole 22, which is passed through by a guider 23. The guider has a rear end, which is fixed on the main body 10, and a front end, which is attached to a fixing element 41. The fixing element 41 in turn is mounted on the window frame, such that the guider 23 is stretched out in a straight line, guiding the pleated curtain 20 when unfolding and folding the pleated curtain 20.

To the fixing strip 21 on the rear end of the pleated curtain 20 several latches 24 are attached. The fixing element 41 and further fixing elements 42 are mounted on the window frame by means of fixing plates 43, 44. The fixing plates 43, 44 have inner sides with gripping surfaces 45, 46. When the pleated curtain 20 is unfolded, the latches 24 stick to gripping surfaces 45, 46, such that the fixing strip 21 is secured to the fixing elements 41, 42.

As shown in FIG. 2, a flap 25 is mounted on the rear end of the pleated curtain 20 to be manually gripped when the pleated curtain 20 is unfolded. The main body 10 has on one side a U-shaped hook 12, and the flap 25 has a catch 26, which fits into the hook 12 and is held thereby, when the pleated curtain 20 is folded and accommodated in the groove 11.

As shown in FIGS. 1 and 2, a guider 31. runs along the pleated curtain 20 near the upper edge thereof. The guider 31 consists of two parallel threads with rear and front ends, one on each side of the pleated curtain 20, guiding the pleated curtain 20 to unfold along the car window. The guider 31 is extendable and contractible, as controlled by the guiding system 30.

Figure 3:
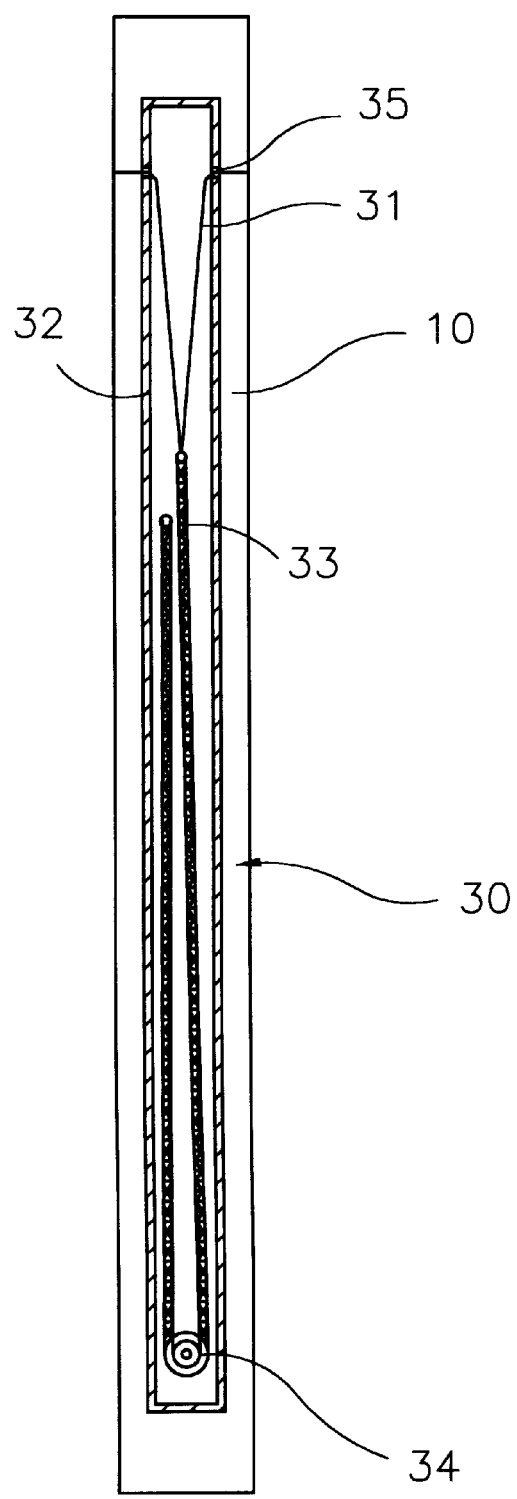
FIG. 3 is a sectional view of the guiding system of the present invention.

Referring to FIG. 3, the guiding system 30 comprises: a casing 32, mounted on the rear side of the main body 10; an elastic cord 33 inside the casing 32; and several guiding reels 34 for guiding the elastic cord 33. The casing 32 has two through holes 35 close to the upper end thereof. The two threads of the guider 31 pass through the holes 35, respectively.

The rear ends of both threads of the guider 31 are connected to one end of the elastic cord 33. When the pleated curtain 20 is unfolded, the guider 33 is drawn outward by the forward movement of the fixing strip 21, against the elastic force of the elastic cord 33. For folding the pleated curtain 20, the elastic force of the elastic cord 33 pulls the guider 31 back into the casing 32. At the front ends of the threads of the guider 31 a latch 36 is attached. When the pleated curtain 20 is unfolded, the latch 36 sticks to a grip-ping surface on a fixing element 37, which is mounted on the car window, so as to fix the guider 31.

Figure 4:
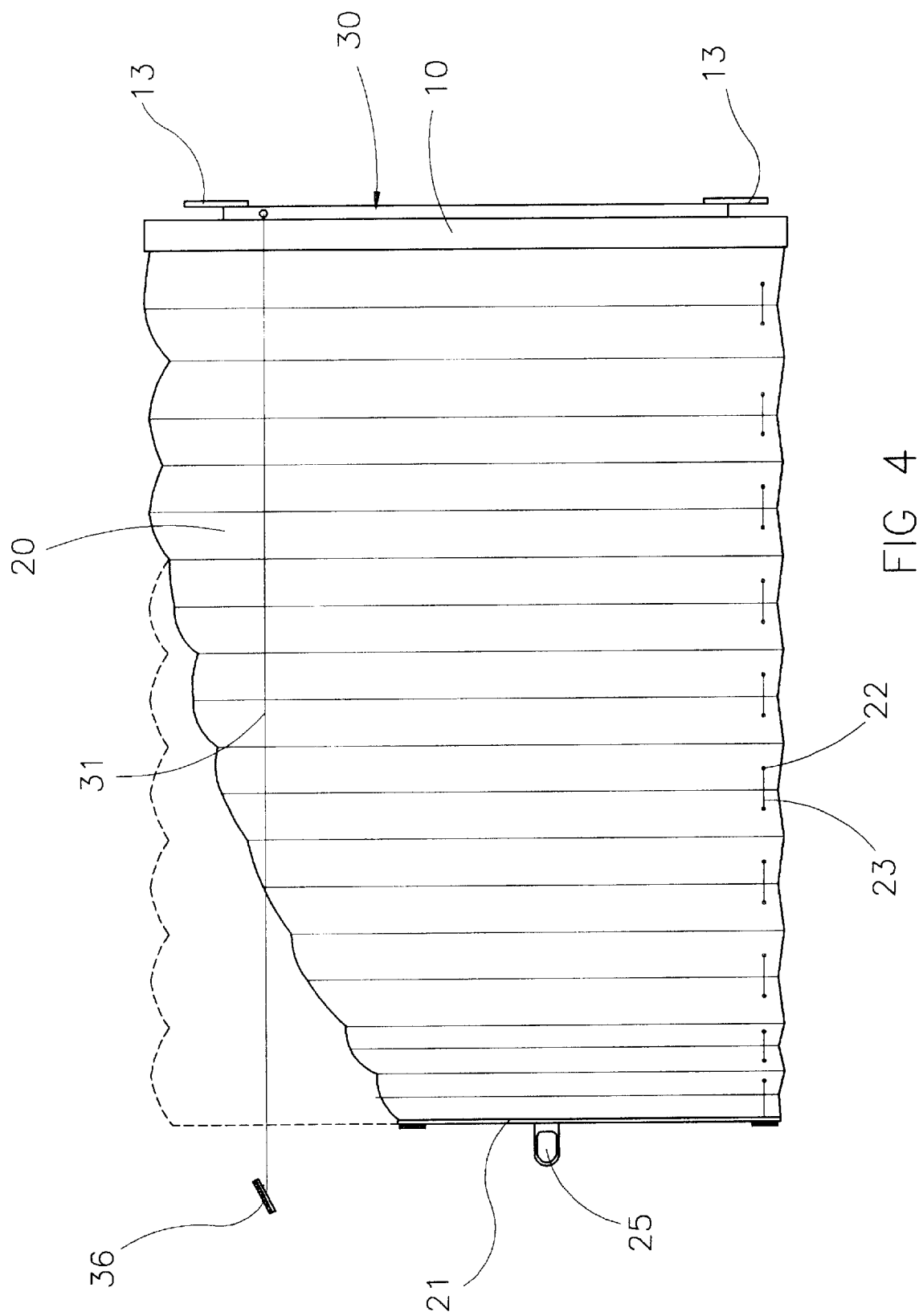
FIG. 4 is a schematic illustration of cutting the car curtain of the present invention.

Referring to FIG. 4, the pleated curtain 20 of the present invention allows to be cut to tie size and shape of any car window. The main body 10 and the fixing strip 21 are made of cuttable material, too. Thus the car curtain of the present invention is adaptable to any car window as well.

Figure 5:
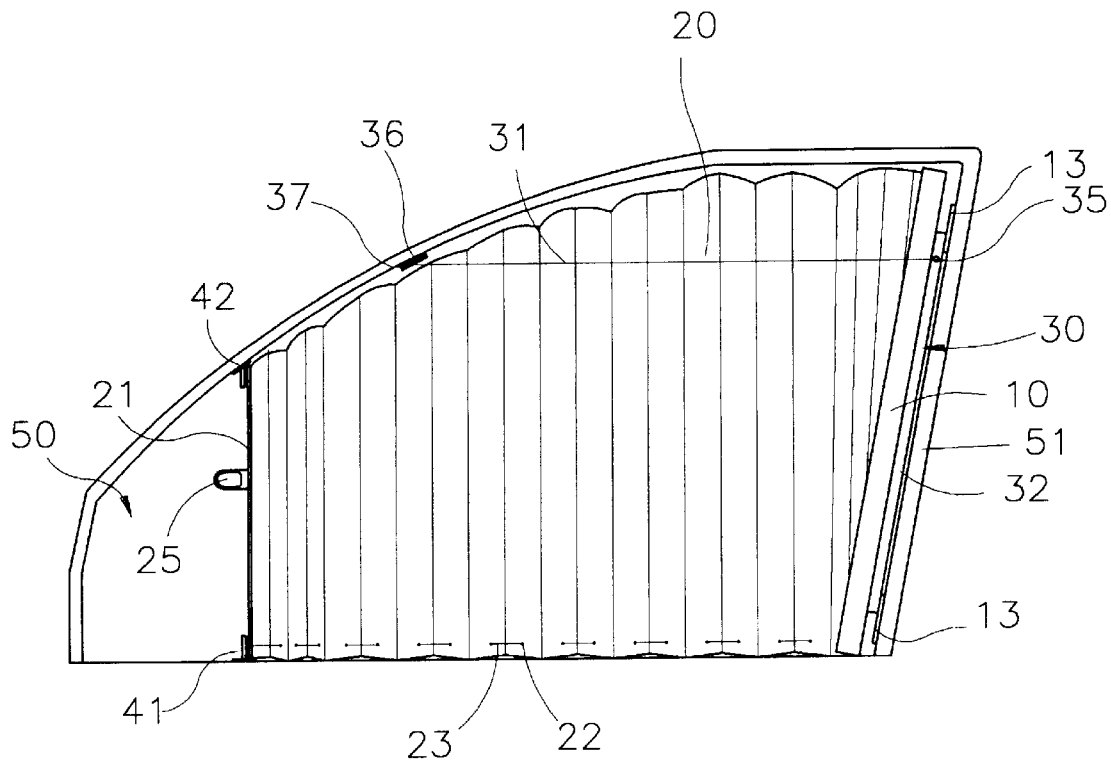
FIG. 5 is a schematic illustration of the car curtain of the present invention installed in a car window, when unfolded.
Figure 6:
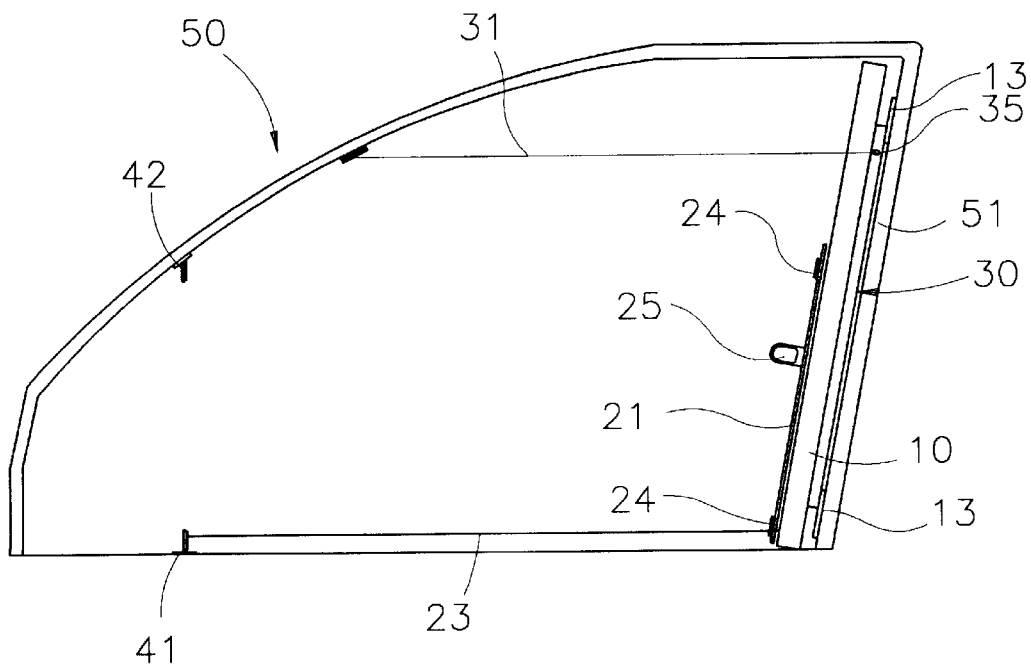
FIG. 6 is a schematic illustration of the car curtain of the present invention installed in a car window, when folded.

Referring to FIGS. 5 and 6, for installing the car curtain of the present invention on a car window 50 inside a window frame 51, the main body 10 and the guiding system 30 are mounted on the inner side of the window frame 51 by the fixing devices 13, the fixing elements 41, 42 are attached to the car window 50 opposite to the main body 10. Then the front end of the guider 23 is fixed on the fixing element 41. The fixing element 37 is attached to the inner side of the window frame 51, such that the guider 31 is stretched out horizontally and fixed to the fixing element 37 by the latch 36. Thereby the car curtain of the present invention will not sway when unfolded and will follow a curved, nonvertical surface of the car window 50.

Figure 7:
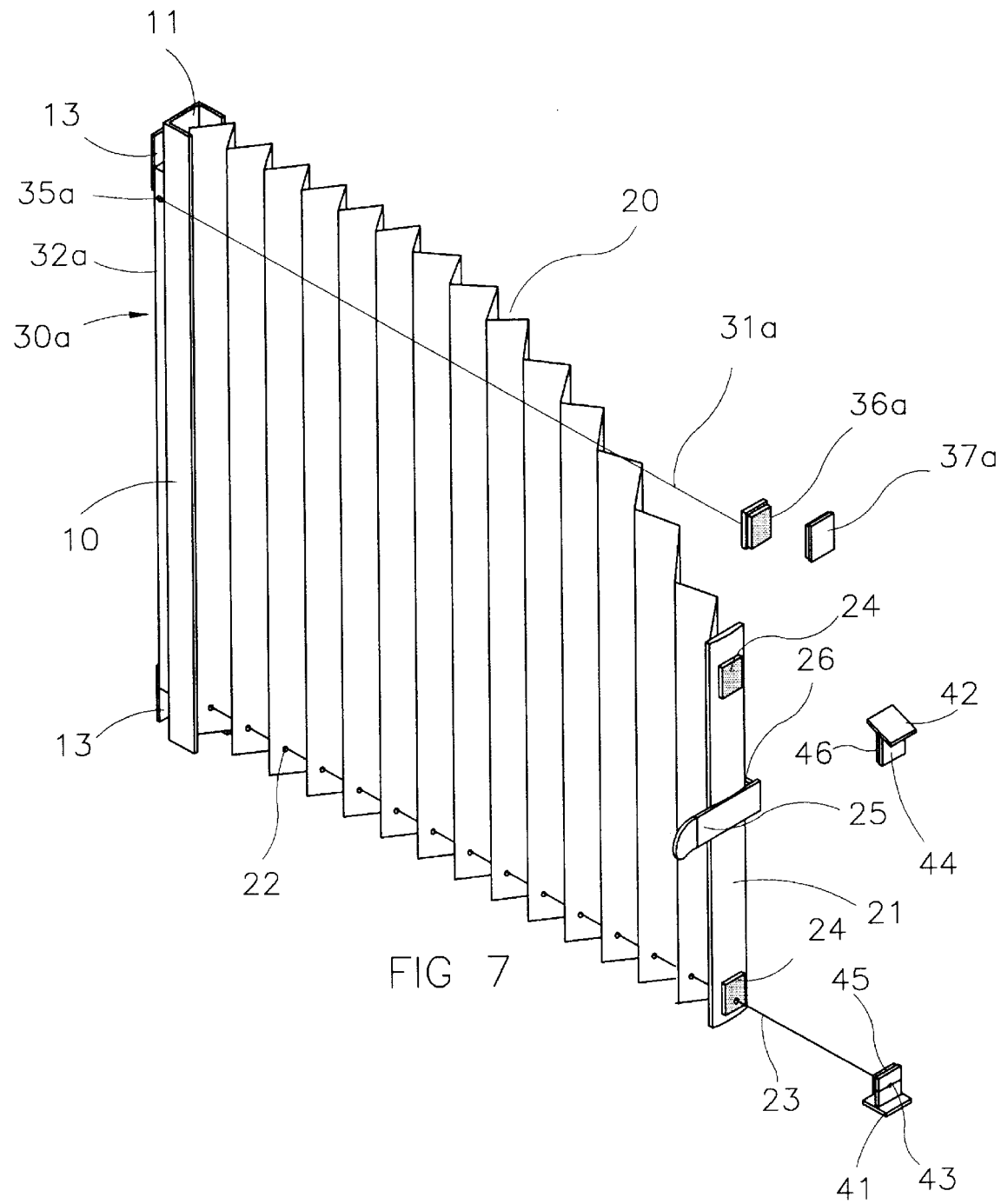
FIG. 7 is a perspective view of the car curtain of the present invention in the second embodiment.

Referring to FIG. 7, the car curtain of the present invention in a second embodiment has a guiding system 30a with a guider 31a, which consists of a single thread. The guider 31a runs along the outer side of the pleated curtain 20 and has a front end, to which a latch 36a is attached. When the pleated curtain 20 is unfolded, the latch 36a is fixed to the fixing element 37.

Figure 8:
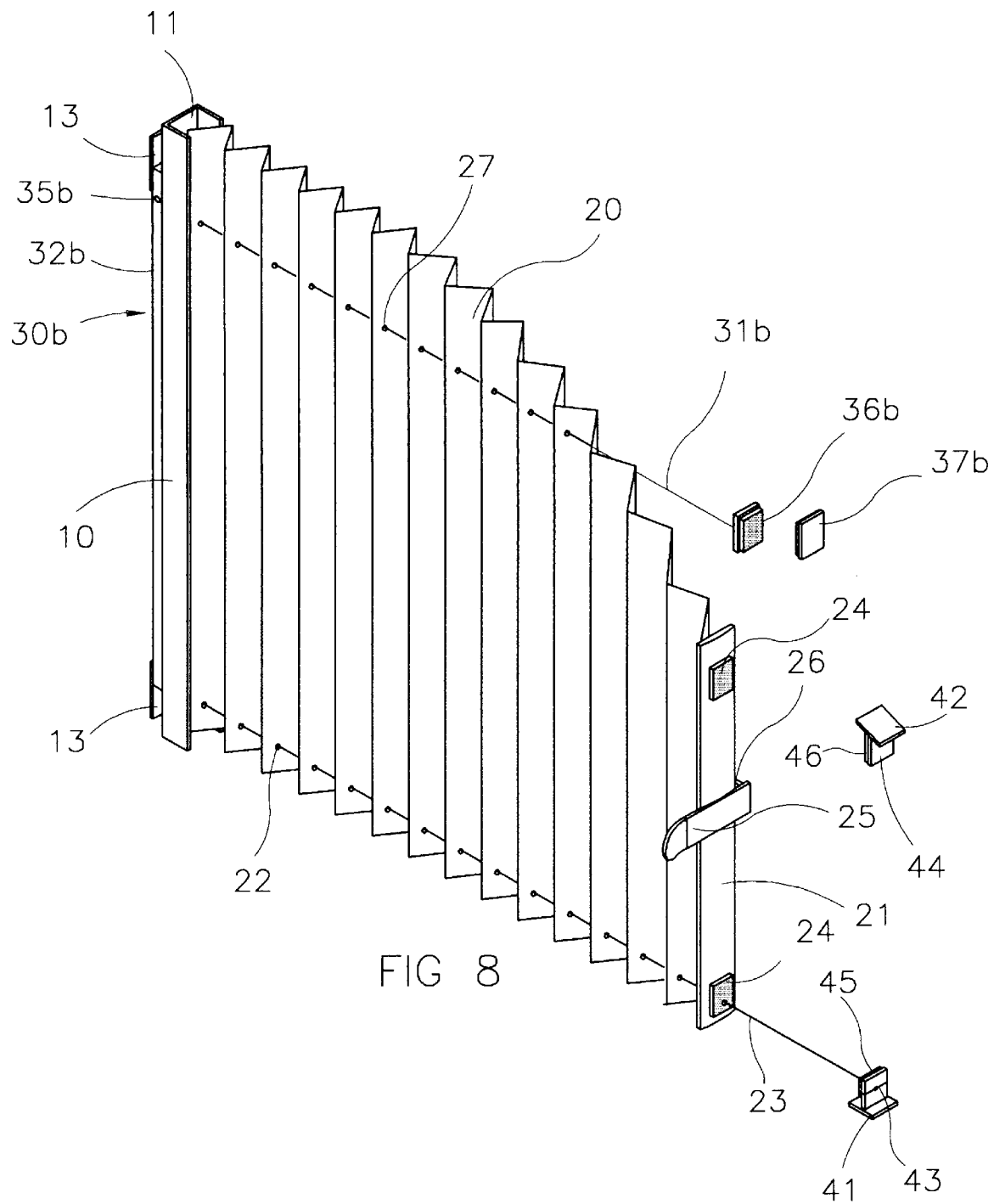
FIG. 8 is a perspective view of the car curtain of the present invention in the third embodiment.

Referring to FIG. 8, the car curtain of the present invention in a third embodiment has a guiding system 30b with a guider 31b, which consists of a single thread. Each of the pleats of the pleated curtain 20 has a through hole 27 at the height of the guider 31b. The guider 31b runs through the holes 27 and has a front end, to which a latch 36a is attached. When the pleated curtain 20 is unfolded, the latch 36a is fixed to the fixing element 37.

Figure 9:
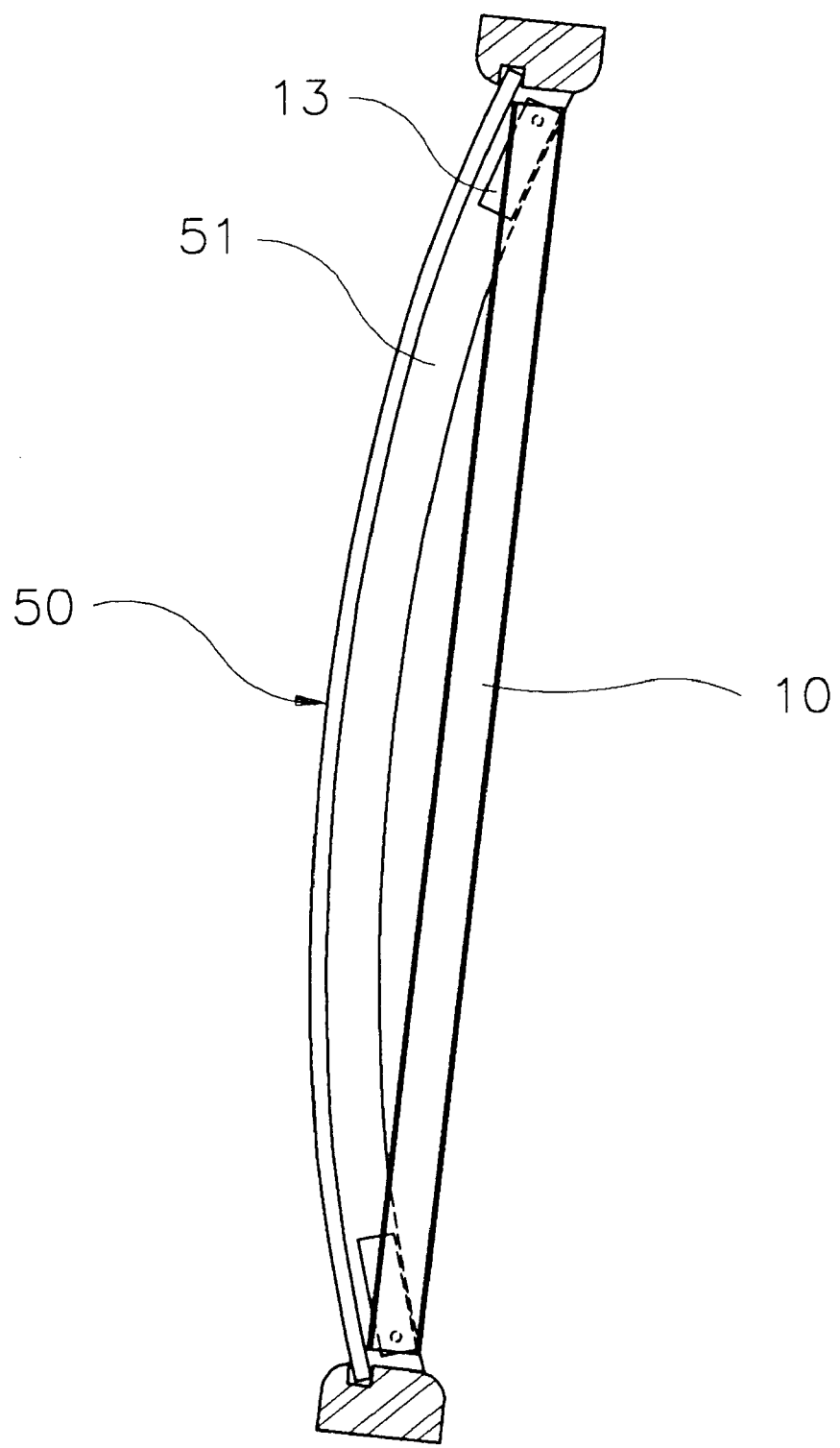
FIG. 9 is a front view of the car curtain of the present invention installed in a car window.

A further characteristic of the present invention is that the fixing devices 13 are plates, bolted to the main body 10 and carrying double-sided adhesive tapes on their back sides. As shown in FIG. 9, the fixing devices 13 are turnable to adapt to any curvature of the car window 50. So the main body 10 is mountable in car windows of any profile.

The car curtain of present invention has the following advantages, as compared with a conventional car curtain:

1. No noise when unfolding or folding the car curtain.
2. Adaptable to any shape of a car window.
3. Easy installation.
4. Little tension of the unfolded curtain, no risk of breaking.
5. Stable installation of the car curtain without drilling holes into the car body.
6. Low cost.
7. Do-it-yourself cutting to desired size and shape.
8. Undisturbed view through the car window and unhindered lowering of the car window, when the curtain is folded, because the guider 31 is then completely accommodated by the casing 32.

While the invention has been described with reference to preferred embodiments thereof, it is to be understood that modifications or variations may easily be made without departing from the spirit of this invention which is defined by the appended claims.

I claim:

1. A car curtain for covering a car window comprising:

a pleated curtain which is foldable and has an upper edge and an outer side facing said car window; and a guiding system from which a guider extends with a variable length, said guider running along one of said outer side of said pleated curtain and through holes in said pleated curtain near said upper edge thereof and consisting of at least one thread with a rear end connected to said guiding system, and a front end attachable to a fixing element at a fixed position adjacent on said car window;

wherein said guider prevents said pleated curtain from swaying and keeps said pleated curtain close to said car window.

2. The car curtain according to claim 1, wherein:

a fixing strip is attached to said front end as a reinforcement.

3. The car curtain according to claim 1, wherein:

said pleated curtain and a fixing strip used as a reinforcement for said front end are formed from a material that can be cut with scissors and knives.

4. The car curtain according to claim 1, wherein:

a fixing strip attached to said front end as a reinforcement has several latches, and several fixing elements are attached to a window frame to secure said latches when said pleated curtain is unfolded.

5. The car curtain according to claim 1, wherein:

said front end of said guider is fixed to said fixing element by a latch.

6. The car curtain according to claim 1, wherein:

said car curtain further comprises a main body with several fixing devices, each of said fixing devices having a plate which is rotatibly mounted on said main body and fixed to a window frame by adhesive, allowing said car curtain to be installed at any desired angle within said window frame.

7. A car curtain for covering a car window comprising:

a main body mounted on a window frame by several fixing devices, each of said fixing devices having a plate which is rotatably mounted on said main body and fixed to said window frame by adhesive, allowing said car curtain to be installed at any desired angle within said window frame;

a pleated curtain having a rear edge which is mounted on said main body, a front edge which is movable away from said rear edge for unfolding said pleated curtain and movable towards said rear edge for folding said pleated curtain, an upper edge, and an outer side facing said car window; and a guiding system, which is mounted on said main body and from which a guider extends with a variable length, said guider running along one of said outer side of said pleated curtain and through holes in said pleated curtain near said upper edge thereof and consisting of at least one thread with a rear end connected to said guiding system, and a front end attachable to a fixing element at a fixed position on said window frame;

wherein said guider prevents said pleated curtain from swaying and keeps said pleated curtain close to said car window.

* * * * *